Figure 1:
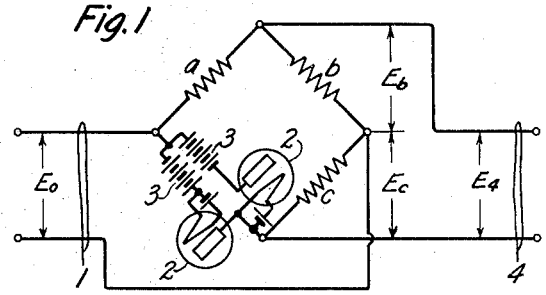

Oct. 30, 1928.

A. A. OSWALD

SIGNALING SYSTEM

Filed May 20, 1925

Inventor:
Arthur A. Oswald
by  Att'y.

Patented Oct. 30, 1928.

1,689,293

UNITED STATES PATENT OFFICE.

ARTHUR A. OSWALD, OF EAST ORANGE, NEW JERSEY, ASSIGNOR TO WESTERN ELECTRIC COMPANY, INCORPORATED, OF NEW YORK, N. Y., A CORPORATION OF NEW YORK.

SIGNALING SYSTEM.

Application filed May 20, 1925. Serial No. 31,475.

This invention relates to signaling systems, and more particularly to a method and means for limiting the voltage applied to a specified part of a transmission circuit.

In a transmission system, in order to attain a high transmission efficiency it is necessary to use the various elements included in the circuit at their maximum rated power. In order to do this and to prevent an excess voltage being applied to these elements when the power in the supply circuit is unexpectedly increased, particularly in the case of high power apparatus where such an overload will interrupt operation, it is desirable to employ a device for limiting the voltage applied to the power apparatus to a certain predetermined value irrespective of the voltage applied to the input side of the device.

In previously known systems, including voltage limiting devices which serve to limit to a predetermined value the voltage supplied to apparatus to be protected, the form of the voltage wave applied to the apparatus will be flat-top, i. e., of constant amplitude during the time the instantaneous value of the voltage supplied to the limiter exceeds the desired value. As a flat-top wave is composed of a wave of applied frequency having a maximum amplitude greater than the flat-top and various harmonics thereof, a wave of amplitude greater than the predetermined maximum will occur in a circuit selective of the wave of applied or fundamental frequency only.

A system of the above type will limit the voltage applied to a circuit only provided the circuit does not discriminate against harmonic frequencies. The potential across the terminals of any circuit in the systems selective of the fundamental will not be limited to the predetermined maximum but will depend upon the length of the flat-top portion and the slope of the sides.

It is an object of this invention to permit a transmission system to be operated at all times at maximum transmission efficiency.

Another object is to limit to a predetermined maximum value the voltage of a wave applied to a system of the above mentioned character.

A further object is to limit to a predetermined value the amplitude of a wave of desired frequency in a transmission system.

A feature of this invention is an impedance network for producing from a wave of one frequency a wave of triple that frequency.

These objects and others which will be apparent as the nature of the invention is disclosed, are accomplished by employing as a voltage limiting device in a transmission system, a Wheatstone bridge having three branches composed of resistances and a fourth branch consisting of a rectifying device. The input circuit is connected across two corners of the bridge and the output circuit is connected across two opposite corners in such a manner that, as the instantaneous input voltage is increased, the output voltage increases up to a certain point and above that point the output voltage decreases. Hence, when the output voltage is greater than the predetermined value, the resultant wave comprises a component of fundamental frequency and various components harmonically related thereto, but the amplitude of the component of fundamental frequency does not increase above the predetermined maximum.

The novel features which are believed to be characteristic of this invention will be pointed out with particularity in the claims appended hereto. However, the invention itself, as to its objects and advantages, the manner of its organization and the mode of its operation, will be best understood by referring to the following description taken in connection with the accompanying drawing, in which, Fig. 1 is a diagrammatic representation of a simplified form of this invention.

Figure 2:
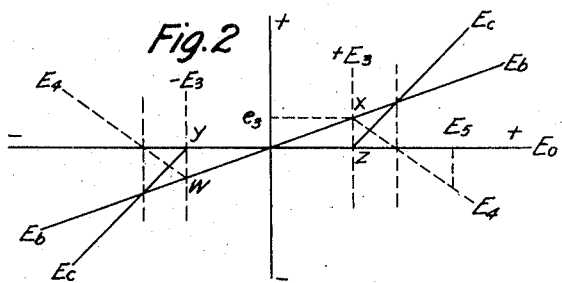
Figure 3:
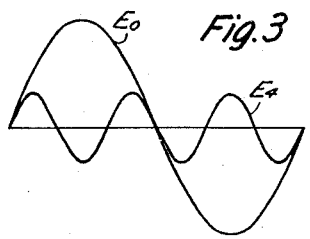
Figure 4:
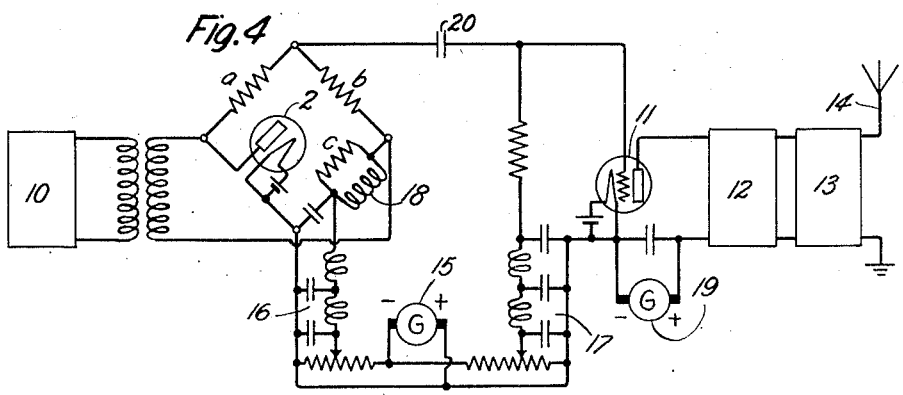

Figs. 2 and 3 show a series of curves to be used in explanation of the operation of the system shown in Fig. 1; and Fig. 4 is a transmission circuit to which a voltage limiting device of the form shown in Fig. 1, is applied.

In Fig. 1 there is shown a voltage limiting device the input circuit 1 of which is connected across two corners of a Wheatstone bridge formed by resistances $a$, $b$ and $c$ and rectifiers 2 which are connected to form respective branches of the bridge. Rectifiers 2 are shown as space discharge devices having two electrodes although any other unilateral conducting device may be employed. The anodes of rectifiers 2 are negatively polarized by sources 3. The output circuit 4 of the device is connected across corners of the bridge opposite to those across which the input circuit 1 is connected.

In the operation of this device, with a voltage of instantaneous value $E_0$ impressed upon the input circuit 1 the instantaneous voltage $E_4$ across the output circuit 4 is equivalent to the instantaneous voltage $E_b$ due to the flow of current through the resistance $b$ minus the instantaneous voltage $E_c$ due to the flow of current through the resistance $c$. The instantaneous voltage across resistance $b$ due to a potential $E_0$ applied to the input circuit 1 will be equal to $\frac{E_0 b}{a+b}$, provided the impedance of the output circuit is of such value that the current flowing through the circuit 4 is relatively small compared with the current flowing through the elements $b$.

Fig. 2 shows a set of curves illustrating the voltages across the bridge elements as a function of the voltage impressed upon the input circuit, ($E_0$) which is plotted as abscissae.

In this figure the voltage across the resistances $b$ is represented by the line $E_b$—$E_b$ for different values of the impressed voltage $E_0$. As the rectifiers 2 present an infinite impedance and the current flowing through the circuit 4 is negligible, the voltage across resistance $c$ will be zero until the applied voltage $E_0$ becomes equal and opposite to the voltage $E_3$ of one anode polarizing source 3. When this occurs the anode of the corresponding rectifier 2 is positively polarized with respect to its cathode with the result that the impedance of device 2 becomes small compared to that of resistance $c$ and the voltage $E_c$ will be equal to $E_0$—$E_3$. This relation is represented by the curve $E_c$—$y$—$z$—$E_c$ in Fig. 2. Subtracting $E_c$ from $E_b$ the resultant voltage $E_4$ applied across the output circuit 4 will be that shown by curve $E_4$—$w$—$x$—$E_4$ in Fig. 2.

It will be seen from curve $E_4$—$w$—$x$—$E_4$ that as the voltage $E_0$ applied to the input circuit is varied between the limits $+E_3$ and $-E_3$ the voltage $E_4$ at the output terminals will be directly proportional to $E_0$, but as the input voltage $E_0$ increases beyond the value $E_3$, the voltage in the output circuit $E_4$ decreases. It is apparent therefor, that irrespective of the maximum value of $E_0$ the maximum instantaneous value of the voltage $E_4$ may be limited by proper selection of $E_3$ and the value of resistances $a$, $b$ and $c$, whereby the apparatus connected to the circuit 4 may be protected against instantaneous voltages greater than the limiting value.

If an alternating voltage, having a maximum peak voltage less than $E_3$, is applied to line 1 a voltage having the same wave form will occur in line 4. If the peak voltage of the applied wave is greater than $E_3$ the voltage wave applied to the circuit 4 will no longer be of the same form as the applied wave, and its peak will never exceed the limiting value determined by the constants of the bridge. Thus the voltage wave in the circuit 4 will consist of a component of frequency corresponding to the impressed waves and components harmonically related thereto.

The amplitude of the harmonics depends upon the amount by which the maximum potential $E_0$ exceeds voltage $E_3$, and the constant of the bridge. Hence if the constants of the bridge are properly selected as the amplitude of the voltage $E_0$ is increased to a certain value the voltage of the fundamental frequency becomes a maximum and as $E_0$ is further increased only the harmonics are increased. By employing in line 4 means selective of the fundamental frequency there may be applied to a load circuit or apparatus an undistorted voltage wave the maximum value of which is fixed and independent of the value of the voltage applied to the limiting device over line 1.

By suitably selecting the values of voltages $E_0$ and $E_3$, the third harmonic may be made predominant as indicated in Fig. 3. If means selective of the third harmonic is included in line 4 this arrangement may be used to produce a wave of frequency triple that of the wave supplied over the line 1.

In the embodiment of this invention shown in Fig. 4, a source 10 of high frequency waves modulated by speech or other low frequency waves which may be located at the transmission station or connected thereto by a line is connected across two diagonal corners of a voltage limiting device similar to that described above. The two other diagonal corners of the limiting device are connected through a space discharge amplifier 11, a filter 12 and amplifier 13, if desired, to a load circuit 14, which may be a transmission line or a radio antenna.

Negative potential is applied to the anode of device 2 from direct current source 15 through filter 16, and grid polarizing potential is applied to amplifier 11 from source 15 through filter 17. Inductance 18, in parallel with resistance $c$, presents a low resistance path for direct current around resistance $c$ and acts as a choke for high frequency current. Anode potential is applied to amplifier 11 from source 19. Stopping condenser 20 permits the potentials applied to the anode of tube 2 and to the grid of tube 11 to be separately adjusted.

In order to provide a high impedance for the output energy supplied through the bridge, so that the amplitudes of the currents traversing the different arms of the bridge may be maintained in the proper ratio the grid of amplifier 11 must be negatively polarized to such an extent that the grid never becomes positive with respect to the filament. The grid of the space discharge device 11 should be so negatively polarized that approximately no space current flows through it except when a positive potential is impressed upon by the bridge. Under these conditions, since large negative impulses supplied by the bridge will not produce an increase in the external output circuit of device 11 a single rectifier 2 may be employed.

Filter 12 should be designed to pass without appreciable attenuation the wave of fundamental frequency supplied by source 10, but to suppress harmonics of this frequency. In most cases a filter having a sharp cut-off is not essential, as there is a substantial frequency interval between the highest fundamental frequency and the lowest harmonic.

The maximum instantaneous voltage applied to amplifier 13, which may consist of any number of stages necessary to raise the output power to the value desired for transmission, will at all times be less than the limiting value determined by the bridge. As filter 12 selects only the fundamental, the form of the wave transmitted to the load circuit 14 will be similar to that supplied by the source 10, but the maximum value will be determined by the limiting device so that an excessive voltage will not be applied to amplifier 13 when the voltage of source 10 is increased above the specified limiting value.

Although this invention has been shown and described as applied to a particular system for the purpose of completely and clearly disclosing its principles, it is not to be limited thereto, but only in accordance with the scope of the invention, as defined by the following claims.

What is claimed is:

1. In a transmission system, a source of waves having a component of given frequency, an output circuit to which said waves are applied, and means interposed between said source and said output circuit for maintaining an unbroken connection between said source and the output circuit and for limiting the amplitude of the component of said frequency applied to the output circuit to a predetermined value irrespective of the amplitude of the waves applied from said source.

2. In a transmission system, a source of waves having a component of given frequency, an output circuit selective to said given frequency, and means interposed between said source and said output circuit for maintaining an unbroken connection between said source and the output circuit and for limiting the amplitude of the component of said frequency applied to the output circuit to a predetermined value, irrespective of the amplitude of the waves from said source.

3. In a transmission system, a source of waves of a definite frequency, an output circuit, and means interposed between said source and said output circuit for applying to said output circuit waves having a component of said frequency similar in form to the waves of said source but limited in amplitude to a definite maximum value irrespective of the amplitude of the waves from said source.

4. In a transmission system, a source of waves of a definite frequency, an output circuit, and means interposed between said source and said output circuit for applying to said output circuit waves of said frequency having a component similar in form to the waves of said source, the amplitude of the component in said output circuit being proportional to the amplitude of the waves applied from said source as the waves from the source increase up to a given value, and the amplitude of the component in the output circuit being constant as the input wave is increased above said value.

5. A transmission system comprising an input circuit having impressed thereon a wave of a certain frequency, an output circuit selective of said frequency, and voltage limiting means between said circuits for applying to said output circuit an undistorted component of said frequency whose maximum value is fixed and independent of the maximum value of the amplitude of the wave of said frequency in said input circuit when the amplitude of the wave of said frequency in the input circuit exceeds a definite finite value.

6. A transmission system comprising an input circuit having impressed thereon a wave of a certain frequency, an output circuit, and voltage limiting means between said circuits for applying to said output circuit an undistorted component of said frequency whose maximum value is fixed and independent of the maximum value of the amplitude of the wave of said frequency in said input circuit when the amplitude of the wave of said frequency in the input circuit exceeds a definite finite value.

7. In a signaling system, a voltage limiting device comprising a Wheatstone bridge, a unilateral conducting device included in one branch of said bridge, input circuit connections across two corners of said bridge, and output terminal connections across two opposite corners thereof, and means for controlling the operations of said device so that as the instantaneous input voltage is increased above a predetermined maximum value the instantaneous output voltage is decreased.

8. A voltage limiting device comprising a bridge circuit consisting of four branches, resistances comprising three of said branches, and a rectifier comprising one of said branches, an input circuit connected across two corners of said bridge, and an output circuit connected across two opposite corners thereof, and means for controlling said rectifier in such a manner that as the instantaneous voltage of the input circuit increases the instantaneous voltage of the output circuit increases proportional thereto until a predetermined value is reached, above which point the output voltage decreases.

9. In a signaling system including a source of high frequency modulated waves and an amplifier, a potential limiting device connected between said source and said amplifier, whereby the potential applied to said amplifier is prevented from exceeding a certain predetermined value, said limiting device comprising a Wheatstone bridge having four branches, resistances comprising three branches of said bridge, a space discharge rectifier and associated source of anode potential comprising the fourth branch of said bridge, and input and output connections to said device, whereby the output potential is directly proportional to the input potential up to a given predetermined value, and whereby the output potential decreases as the input potential is increased above said predetermined value.

10. In a signaling system including a source of high frequency modulated waves and an amplifier, a potential limiting device connected between said source and said amplifier whereby the potential applied to said amplifier is prevented from exceeding a certain predetermined value, said limiting device consisting of a Wheatstone bridge having four branches, resistances comprising three of said branches, a space discharge amplifier and associated source of anode potential comprising a fourth branch of said bridge, said source of anode potential being adapted to polarize the anode negatively with respect to the cathode of said space discharge rectifier, input and output connections of said device whereby the output potential is directly proportional to the input potential until a certain predetermined value determined by the potential of said source of anode potential is reached, and whereby the output potential decreases as the input potential is increased above said predetermined value.

11. In a transmission system including a source of high frequency signal modulated waves and an amplifier therefor, means for limiting the potential applied to said amplifier whereby as the potential of said source exceeds a certain predetermined value the potential applied to said amplifier is decreased, comprising a bridge circuit and an amplifier having input and output circuits, resistances comprising three branches of said bridge, a space discharge rectifier comprising the fourth branch of said bridge, means connecting said source across two corners of said bridge, means connecting the input circuit of said last mentioned amplifier across two other corners of said bridge, a source of anode potential for said space discharge rectifier, means for applying polarizing potential to the grid of said last mentioned amplifier whereby approximately no space current flows therethrough, a filter associated with the output circuit of said last mentioned amplifier whereby harmonics of the applied waves are suppressed and means for impressing waves passed by said filter upon said first mentioned amplifier.

12. A frequency multiplying device comprising a Wheatstone bridge including a unilateral conducting device in one arm and resistances in the three other arms, means for applying a wave across opposite terminals of said bridge, an output circuit connected across the conjugate terminals of said bridge, and means for controlling said unilateral conducting device so that the frequency of the output current is a multiple of the frequency of the applied wave.

13. In a transmission system, a source of waves including components of given different frequencies, an output circuit selective to said components of given frequencies, and means interposed between said source and said output circuit for maintaining an unbroken connection between said source and the output circuit and for limiting the amplitude of each of said components of given frequencies applied to the output circuit to a predetermined value irrespective of the amplitude of the waves applied from said source.

In witness whereof, I hereunto subscribe my name this 19th day of May, A. D., 1925.

ARTHUR A. OSWALD.